Feb. 2, 1960 C. E. YOST ET AL 2,923,540
ELECTRONIC LOADING INDICATOR
Filed Sept. 30, 1957 2 Sheets-Sheet 2
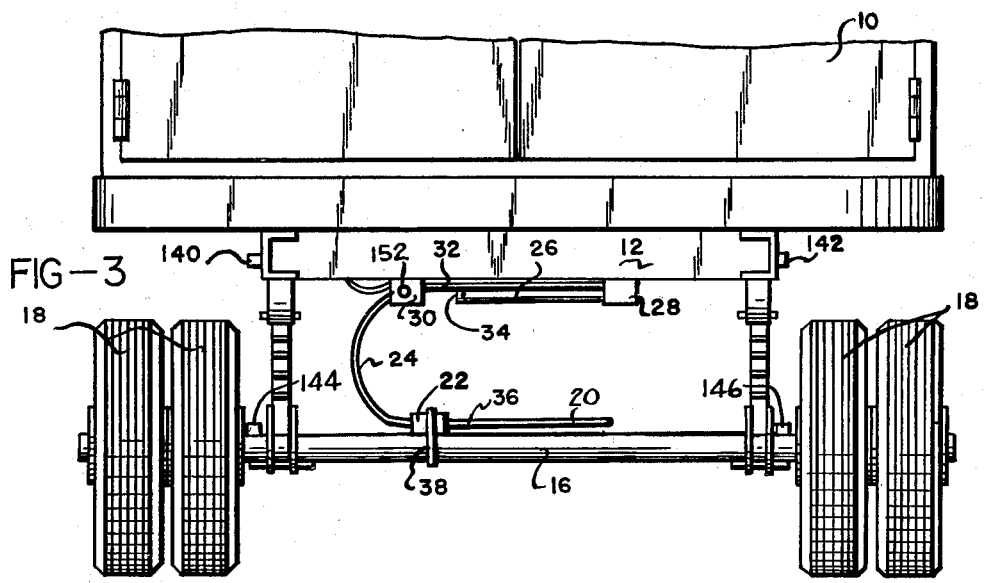
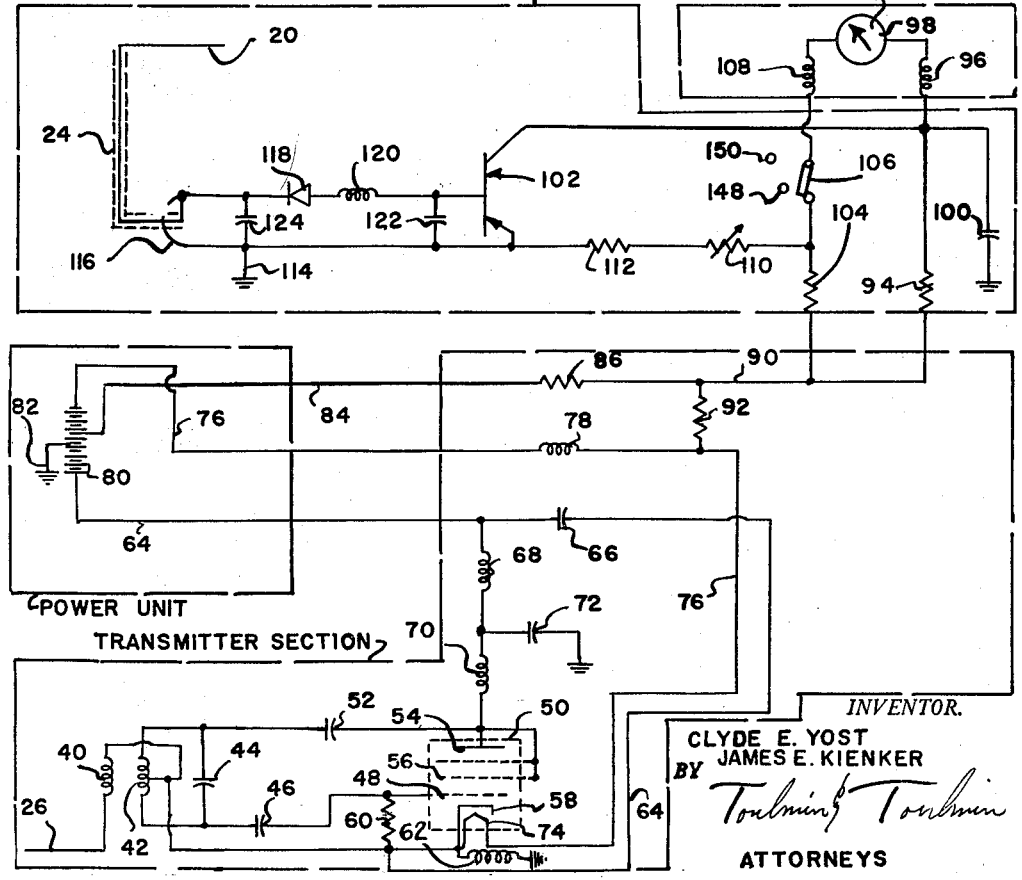
INVENTOR.
CLYDE E. YOST
JAMES E. KIENKER
BY
ATTORNEYS United States Patent Office 2,923,540
Patented Feb. 2, 1960

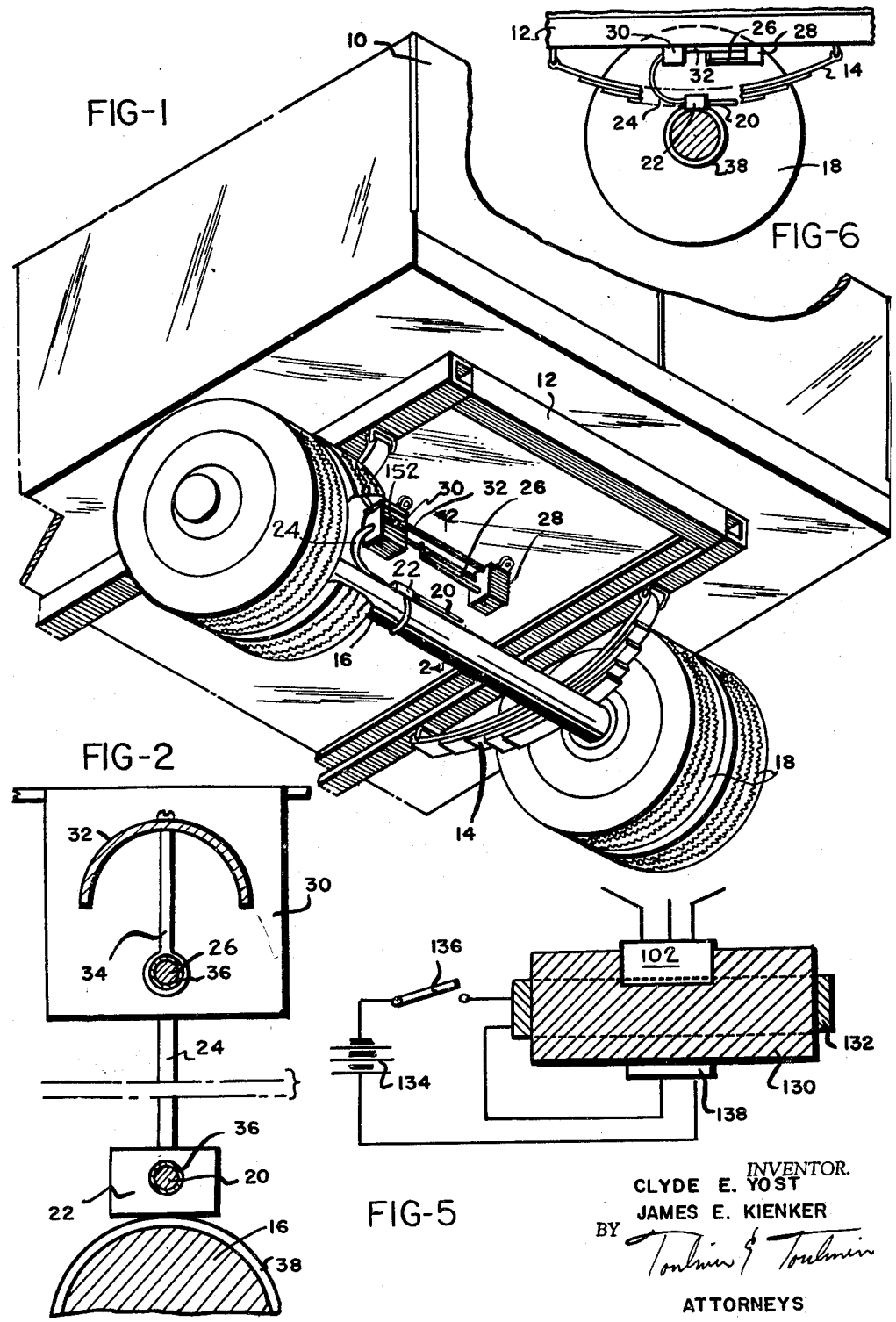

2,923,540

ELECTRONIC LOADING INDICATOR

Clyde E. Yost, Evansville, Ind., and James E. Kienker, Dayton, Ohio, assignors to Ken Standard Corp., Evansville, Ind.

Application September 30, 1957, Serial No. 687,110

6 Claims. (Cl. 265—40)

This invention relates to a method and apparatus for measuring load weights of vehicles and is particularly concerned with an electronic device of this nature especially adapted for being readily mounted on conventional trucks and other similar carriers in connection with which an accurate indication of the load is desired.

In connection with trucks and aircraft and other carriers, it is important that they be properly loaded so that they will carry maximum load properly distributed but without overloading the carrier. In particular connection with trucks and such ground vehicles, practically all states have strict laws regulating total load and axle load and such states likewise having weighing stations where trucks passing through the state are required to weigh in. Severe penalties are invoked for overweight trucks and considerable delay is encountered in carrying out the weighing operations.

Many devices have been proposed for equipping trucks and other carriers with load indicating devices, but these devices have not been satisfactory because they embody direct connections between the body of the vehicle and the axle and which connection is not a reliable sort of device for indicating movement of the body relative to the axle because the axle twists and tilts and is otherwise generally in a state of motion relative to the body whenever the truck is in operation. This, and the conditions of dirt, moisture and the like, to which such connections are exposed make them most unreliable for giving accurate load indications.

In a previously filed application in the name of Ralph Cordell, filed July 25, 1955, and bearing Serial No. 524,193, there is shown an electronic indicating device which is far superior to devices that have been known in the prior art. This comes about because there are no connections between the axle and the vehicle body except a flexible antenna cable and thus the twisting and tilting of the axle relative to the truck body has no adverse effect on any part of the indicating device. Further, the delicate electronic components can be mounted on the truck body and only a simple antenna mounted on the axle thereby removing all sensitive components of the arrangement from the axle where most of the jolting and jarring occurs.

The present invention represents a still further development and refinement in the broad ideas disclosed in the Cordell application referred to above and introduces new concepts in connection with the practice of load indicating not conceived in that application.

The present invention has as a primary object the provision of a highly accurate but extremely economical construction of an electronic load indicating device of the nature referred to.

A still further object is the provision of an extremely rugged load indicating device which will have long life and which will retain its accuracy.

A still further object of this invention is the provision of a simple and compact load indicating device of the nature referred to in which the effects of varying ambient temperature are eliminated so that the indicating device gives a proper indication in hot regions as well as in cold regions.

Another object of this invention is the provision of a simple transistor receiving circuit in which a high degree of amplification is obtained while utilizing only a very few simple components.

It is also an object of this invention to provide a weighing device of the nature referred to in which the transmitting antenna is shielded from the metal of the truck or carrier body so that the signal received by the receiving antenna is influenced only by its spacing from the transmitting antenna.

These and other objects and advantages will become more apparent from reference to the drawings, in which:

Figure 1 is a perspective view looking up from beneath a truck showing an arrangement according to the present invention mounted thereon;

Figure 2 is a sectional view indicated by line 2—2 on Figure 1;

Figure 3 is a rear elevational view of the truck showing the location of the unit of the present invention when center mounted beneath the truck body and also showing diagrammatically the manner in which units could be placed adjacent the ends of the axle so as to obtain individual wheel loads if so desired;

Figure 4 is a diagrammatic representation of the preferred electronic transmitter and receiver circuits of the load indicating device of the present invention;

Figure 5 is a more or less diagrammatic view showing the manner in which the transistor element of the receiver circuit is mounted in a constant temperature bed; and Figure 6 is a fragmentary view showing the manner in which a transmitter and receiver unit according to this invention could be located adjacent a wheel to indicate wheel loads.

Referring to the drawings somewhat more in detail, Figures 1 and 3 illustrate a truck having a body 10 resting on a frame or chassis 12 and which frame or chassis is supported by springs 14 on an axle housing 16 that carries at the ends thereof the wheels 18.

According to the present invention, there is mounted on axle housing 16 in about the center thereof a rod 20 which comprises a receiving antenna. Antenna 20 has one end supported in a block of phenolic 22 and leading therefrom is a shielded antenna cable 24.

Mounted on the bottom of the truck body or on frame or chassis 12 directly above antenna 20 is a transmitter antenna 26. Transmitter antenna 26 extends outwardly from a transmitter case 28 which is a boxlike metal enclosure within which the electronic components of the transmitter circuit are mounted.

In spaced relation with transmitter case 28 is another metallic boxlike case 30 to which cable 24 leads and within which are the electronic components of the receiver circuit.

An arcuate metallic shield member 32 extends between cases 28 and 30 and is fixed thereto. Shield member 32 shields antenna 26 from the metal of the truck body or frame above the antenna so that the signal transmitted by the antenna is not in any way influenced by the metal of the truck body or by any load that may be placed in the truck body.

The antenna 26 has its one end supported on a phenolic bushing or the like in the inner wall of transmitter case 28 while at the other end antenna 26 is supported by a phenolic post 34 extending upwardly and secured to shield 32.

The outer end of antenna 20 may be supported by a phenolic block or the like if so desired.

As will be seen in Figure 2, both antennas 20 and 26 are provided with a plastic coating 36 which protects the antennas from corrosion due to exposure to the elements as will be evident would occur if no protection of this nature were provided.

The receiver antenna 20 is preferably secured fixedly in place on axle housing 16 as by clamp means 38 which is connected with the phenolic block 22 that supports the antenna.

In addition to the plastic coating on the antennas, the unit is so constructed that it can be entirely coated with a grease or the like, thus excluding moisture and protecting the entire unit from snow, rain, dust and dirt.

Turning now to Figure 4, the particular electronic circuit which is housed within the transmitter case 28 and receiver case 30 is illustrated together with the power unit, the antennas, and the indicating instrument that is mounted within the cab of the truck.

In Figure 4 the transmitter antenna 26 is connected through coil 40 with the mid tap of coil 42 that is inductively coupled with coil 40. Coil 42 is bypassed by a capacitor 44 and one end of the said coil is connected through a capacitor 46 with grid 48 of oscillator tube 50 while the other end of the coil is connected through condenser 52 with the plate 54 of the tube and which plate is connected with the suppressor grids 56.

The aforementioned mid tap of coil 42 is connected with cathode 58 of tube 50 and a resistor 60 is connected between the cathode and control grid 48. The cathode is also connected to ground via radio frequency choke 62 and with the positive side of the power supply by a connection 64 which connection includes an electrolytic capacitor 66.

Connection 64 on the power supply side of capacitor 66 is connected with plate 54 via the serially connected radio frequency chokes 68 and 70 from between which a connection is taken to ground through condenser 72.

The tube 50 also comprises a heater 74 having a connection by wire 76 with the negative side of the power supply, about 6.3 volts. This connection includes radio frequency choke 78.

The particular power supply in practice will usually comprise a multi-vibrator circuit with transformer and filter means but in order to simplify the disclosure of the present invention, there has been illustrated as a power source a battery 80. This battery has the connection 64 leading from one end and which connection is at a voltage of from 175 to 225. From the other end of the battery the connection 76 leads and this may be at a voltage of about minus 12.6.

There is a ground connection at 82 for battery 80 and at a point on the negative side of ground 82 at about 1.5 volts there is taken another connection 84. Connection 84 leads through a resistor 86 to a wire 90 which is connected through resistor 92 with the filament side of radio frequency choke 78. Wire 90 is also connected through resistor 94 and radio frequency choke 96 with one side of the indicating instrument 98 that is mounted in the vehicle cab for observation by the truck driver. Between resistor 94 and choke 96 there is a connection to ground through condenser 100 and there is also a connection with one terminal of the PNP transistor 102.

Wire 90 is also connected through resistor 104, selector switch 106 and radio frequency choke 108 with the opposite side of indicating instrument 98.

Between resistor 104 and selector switch 106 there is a connection through the variable resistor 110 and fixed resistor 112 with another terminal of transistor 102 and also with ground at 114.

The receiver antenna 20 is connected by a previously-mentioned shielded cable 24 with antenna coil 116 which is located inside receiver cable 30. One side of the antenna coil is grounded at 114 and the other side leads through the silicon diode 118 and radio frequency choke 120 to the third terminal of transistor 102.

A condenser 122 is connected between the aforementioned second and third transistor terminals while a trimmer condenser 124 is connected across antenna coil 116.

It will be appreciated that the transmitter circuit referred to above is substantially a Pearce oscillator circuit and that the receiver circuit is essentially a current-operated device rather than a device in which a voltage signal is amplified and then utilized for providing an indication. In the receiver circuit of the present invention the signal received by antenna 20 is rectified by the silicon diode and an amplified direct current output is obtained directly from the transistor 102 and this is measured by the instrument 98. This results in an extremely simply circuit in which the drift that often occurs in multi-stage circuits is entirely eliminated. The output of the transistor is substantial and reliable and falls well within the limits that can readily be measured by a relatively simple current sensitive device, such as a microammeter.

The simplicity of the receiver circuit permits ready adjustability of the sensitivity thereof by variable resistor 110 so that one and the same load indicating device is usable with various trucks, some of which deflect only two inches when fully loaded and others of which may deflect as much as eight inches.

The oscillator circuit of the transmitter section is stable under substantially all conditions of constant voltage and the receiver circuit likewise is stable except for the sensitivity of the transistor element to temperature changes.

With this in mind, in order to obtain the advantages of the transistorized receiving circuit, the transistor 102 is placed in a heat bed 130 as illustrated in Figure 5 and which heat bed comprises a block of lead or the like having large thermal capacity so that temperature fluctuations of the transistor are substantially eliminated.

The stability of temperature of the transistor is made practically absolutely constant by providing block 130 with a heater element 132 connected with battery 134 through switch 136 and with a thermostat being provided to control the circuit, such as the wafer thermostat 138.

The entire assembly may be provided with heat insulating material if so desired.

The thermostat 138 is selected to hold the temperature of block 130 and, therefore, of transistor 102 at about 140 to 150 degrees Fahrenheit, whereby the transistor becomes insensitive to ambient conditions.

For some purposes, the single unit illustrated in Figures 1 and 3 mounted in the center of an axle would be satisfactory. Such an arrangement would indicate total axle load. In most cases, however, it is desired to distribute a plurality of transmitters about the truck body as diagrammatically illustrated at 140 and 142 in Figure 3 to associate therewith receivers 144 and 146. These units could be utilized to give individual wheel loads and when so utilized one and the same indicating instrument 98 could be employed by utilizing selector switch 106 which could be moved to its terminals 148, 150, and so on, to place the instrument in circuit with the different devices distributed about the truck body. In this manner the important individual wheel loads would be obtained while total load could be obtained by adding up the wheel loads. Any load shifting or unequal loading would be reflected in the readings of individual wheel loads taken in this manner.

From the foregoing, it will be seen that the present invention provides for a greatly improved and simplified accurate and dependable load indicting device having wide utility and which can be utilized in connection with trucks, aircraft and other carriers to give accurate indications of the load thereon.

Inasmuch as the indicating instrument 98 is mounted in the cab of the vehicle, it is preferred to provide the receiver case 30 with a receptacle 152 (see Figure 3) into which another instrument could be plugged so that during loading of the truck an indication of the load would be had and also so that the load on the truck, or on the truck wheels, could readily be checked by State officials at weighing stations by utilizing their own instrument.

While the device of the present invention has been particularly described as comprising a transistorized circuit, it will be evident that in many cases a vacuum tube receiver circuit could be employed and successful results would obtain. In case either a transistorized circuit or a vacuum tube circuit is utilized the same advantageous arrangement could be made wherein the transmitting and receiving circuits are contained within spaced cases between which extends the reflector that backs up the transmitting antennae.

It will also be evident that while a preferred arrangement of the transmitting and receiving antennae is in vertical alignment, these elements could be located in any manner such that the spacing between them varied according to the load on the truck whereby the indicating instrument would provide a reliable indication of the loading on the truck by indicating the movement of the truck relative to the running gear.

The bed truck illustrated has a continuous axle extending between the wheels and in such a case the unit can be mounted as illustrated in Figures 1 or 3, but in cases where there is no axle extending completely across between the wheels, the arrangement of Figure 6 is to be preferred and this particular arrangement wherein the transmitter and receiver antennae are adjacent the wheels could readily be extended to all the wheels of a vehicle whereby all axle loads at the wheels could readily be determined.

In practice the unit according to the present invention is adapted for being mounted on different types of truck bodies and which are constructed of different materials with different arrangements of the mass of material and with the unit being located at different distances from the body of the truck, the provision of the shield 32 becomes important for making substantially uniform the radiating characteristics of the transmitting antenna.

The provision of the shield 32 thus greatly reduces the adjustments that must be made in the unit according to this invention in adapting it to different situations and makes the unit substantially independent of the characteristics of the truck body of any load that might be placed therein.

It will be evident that in operation, since the transmitter antenna is radiating substantially radially, the strength of the signal delivered to the receiving antenna will vary in accordance with the spacing between the antennae whereby the strongest signal will be picked up when the antennae are closest together indicating the heaviest load on the truck and the signal will be weakest when the antennae are farthest apart indicating the smallest load on the truck.

This is merely exemplary of the manner in which the signal can be made to vary with the amount of load on the truck body.

The indicating device 98 has been referred to as being sensitive to the amplitude of the current put out by the receiving circuit and is accordingly referred in the claims as a current-sensitive device. It will be understood, however, that an electric indicating device of the type that could be made sensitive to fluctuating current conditions could be employed, including a volt meter where the receiving circuit discharged through a suitable calibrated resistor, or an ammeter where the receiving circuit is arranged to discharge directly through the indicating instrument.

It will be understood that this invention is susceptible to modification in order to adapt it to different usages and conditions; and, accordingly, it is desired to comprehend such modifications within this invention as may fall within the scope of the appended claims.

We claim:

1. In a load indicator for vehicles such as trucks having a body resiliently supported on a running gear; a radiation transmitter means, a radiation receiver means, one of said means being mounted on the vehicle body and the other being mounted on the vehicle running gear, said transmitter comprising a stable oscillator and a radiating antenna and said receiver means comprising a receiving antenna and an amplifying circuit, and a current-sensitive indicating instrument connected to receive the output from said receiver means.

2. In a load indicator for vehicles having a running gear and a load supporting body resiliently mounted thereon, a housing mounted on the body comprising a radiating antenna, a receiving antenna mounted on the running gear in spaced relation with the radiating antenna, a receiving circuit in the housing connected with the receiving antenna, an oscillator circuit also in the housing connected with said radiating antenna, and a current-sensitive indicating instrument connected to receive and indicate the output of said receiving circuit.

3. In a load indicator for vehicles having running gear and a load supporting body resiliently mounted thereon, an elongated housing mounted on the body comprising a radiating antenna, a receiving antenna mounted on the running gear in spaced relation with the radiating antenna so the relation changes as the body is loaded, a receiving circuit in the housing connected with the receiving antenna, an oscillator circuit also in the housing connected with said radiating antenna, and a current-sensitive indicating instrument connected to receive and indicate the output of said receiving circuit, said housing being formed with a casing at one end thereof in which the receiving circuit is mounted and a casing at the other end thereof in which the oscillator circuit is mounted, and a shield extending between the casings on the side of the radiating antenna, said shield providing for substantially uniform downward radiation from the antenna regardless of the nature of the truck body.

4. In a load indicator of the nature described; a housing adapted for being mounted beneath a truck body, said housing having a first casing portion at one end of the housing having an oscillator circuit therein, a second casing portion at the other end of the housing having a receiving and amplifying circuit therein, a shield concave downwardly in cross section extending between the casing portions, a radiating antenna extending from the first casing portion beneath the shield and parallel therewith to radiate energy downwardly, said shield providing for substantially uniform downward radiation from the antenna regardless of the nature of the truck body, a receiving antenna adapted for being insulatingly mounted on the running gear of a truck beneath the radiating antenna, a shielded cable leading from the receiving antenna to the second casing portion, and a current-sensitive indicating instrument connected to receive the output from the receiving circuit thereby to indicate the spacing of the antennas.

5. In a load indicator of the nature described; an oscillator circuit and a radiating antenna connected thereto, a receiving antenna, a receiving circuit connected to the receiving antenna, and a current-sensitive indicating instrument connected to receive the output of the receiving circuit, said receiving circuit comprising a single transistor, a rectifier connecting the receiving antenna with one terminal of the transistor, and said indicating instrument being connected to receive the output of said transistor directly.

6. In a load indicator of the nature described; an oscillator circuit and a radiating antenna connected thereto, a receiving antenna, a receiving circuit connected to the receiving antenna, and a current-sensitive indicating instrument connected to receive the output of the receiving circuit, said receiving circuit comprising a single transistor, a rectifier connecting the receiving antenna with one terminal of the transistor, and said indicating instrument being connected to receive the output of said transistor directly, said transistor being imbedded in a member of substantial thermal capacity and substantially constant temperature thereby to maintain the temperature of the transistor substantially constant.

References Cited in the file of this patent
UNITED STATES PATENTS

| | | |
|---|---|---|
| 1,621,093 | Troll | Mar. 15, 1927 |
| 2,457,751 | Thompson | Dec. 28, 1948 |
| 2,506,585 | Elliott | May 9, 1950 |